Jan. 6, 1925.
W. CAMPBELL
VIBRATION INDICATOR
Filed Dec. 19, 1921
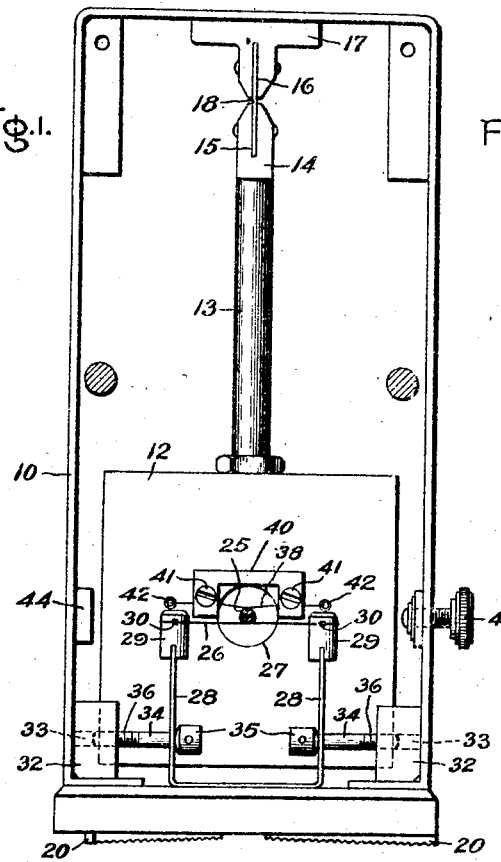
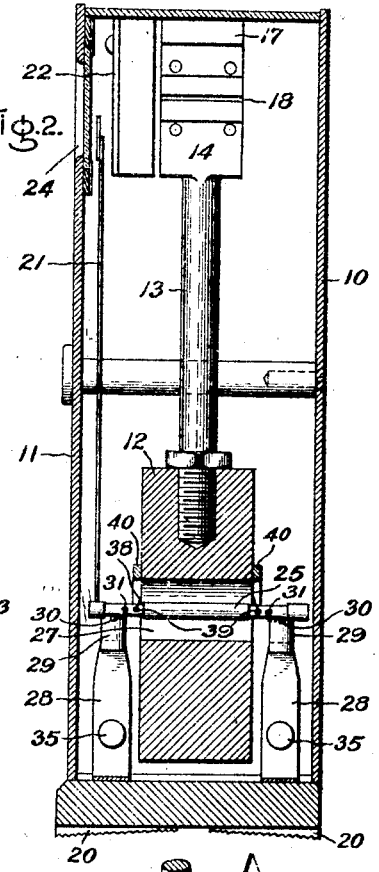
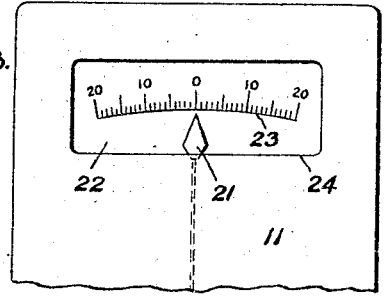
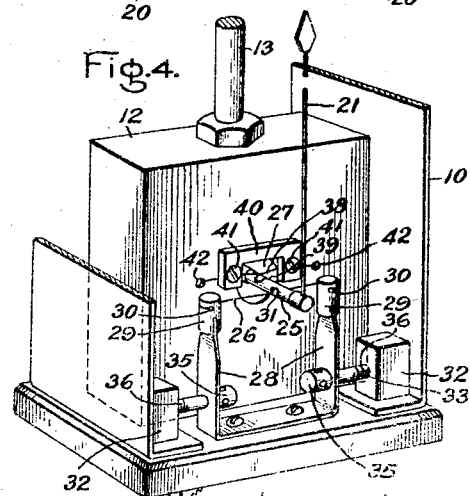
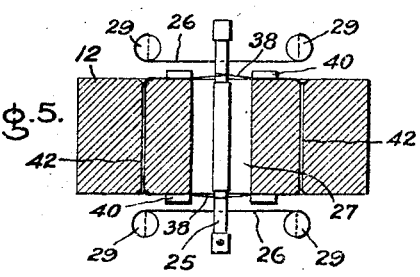
Inventor;
Wilfred Campbell,
by Albert H. Davis
His Attorney.

Patented Jan. 6, 1925.

1,522,175

UNITED STATES PATENT OFFICE.

WILFRED CAMPBELL, OF SCHENECTADY, NEW YORK, ASSIGNOR TO GENERAL ELECTRIC COMPANY, A CORPORATION OF NEW YORK.

VIBRATION INDICATOR.

Application filed December 19, 1921. Serial No. 523,415.

*To all whom it may concern:*

Be it known that I, WILFRED CAMPBELL, a subject of the British Empire, residing at Schenectady, in the county of Schenectady, State of New York, have invented certain new and useful Improvements in Vibration Indicators, of which the following is a specification.

The present invention relates to vibration indicators and has for its object to provide an improved instrument of this type.

For a consideration of what I believe to be novel and my invention, attention is directed to the accompanying description and the claims appended thereto.

In the drawing, Fig. 1 is a face view of a vibration indicator embodying my invention, the cover plate and scale plate being removed in order to show the parts behind them; Fig. 2 is a vertical sectional view of Fig. 1; Fig. 3 is a face view of the upper part of the instrument with the cover in place; Fig. 4 is a perspective view of certain parts; and Fig. 5 is a transverse sectional view through the weight and pivoting means for the indicating pointer.

Referring to the drawing, 10 indicates a rectangular casing or housing having an open front closed by a cover plate 11. The sides, top and rear walls of the casing may be made of comparatively thin sheet material but the bottom wall is preferably in the form of a comparatively thick piece of metal so as to give weight to the bottom. This serves to bring the center of gravity of the instrument well toward its lower end so that when set down it stays put. Suspended from the top wall of casing 10 is a pendulum or weight 12, the same being carried by the lower end of a rod 13. The upper end of rod 13 terminates in a rectangular transversely-elongated head 14 having a transverse slot 15 which aligns with a transverse slot 16 in a suspension clip 17 fixed to the top wall of casing 10. Fastened in slots 15 and 16 is a flat suspension spring 18 which serves to connect rod 13 to clip 17. Spring 18 is thin and quite wide so it is readily flexible in a direction at right angles to its surface but is rigid in all other directions. It will thus be seen that weight 12 is suspended by a spring in such manner that the casing and weight may move or vibrate in one direction relatively to each other but in no other direction. As a matter of convenience, it may be considered that the weight and casing are movable transversely relatively to each other. As will be seen from Figs. 1 and 2, the active length of flat spring member 18 is equal to the distance between the adjacent edges of head 14 and clip 17 and that it is quite short. The spring is made short to localize the fulcrum between the weight and the casing so as to insure that the bending of the spring will always take place at substantially the same point. In other words, it is desirable to have the fulcrum as near a straight line as possible.

The bottom of the base of casing 10 is provided with sloping ridges or projections 20 having corrugations or teeth on their lower surfaces. This enables the device to be placed on a curved or rounded surface, the teeth serving to hold it from sliding.

When a structure as just described is placed on an object subject to vibrations, the casing 10 will vibrate with the object while the weight 12 will remain stationary. There is thus a relative movement set up between the casing and weight. The amplitude of the vibrations is indicated by the extent of the relative movements while the frequency of the vibrations is indicated by the reversals of the relative movements.

To indicate the amplitude and frequency of the movements between the casing and weight I provide an indicating pointer 21, the free end of which moves over a scale plate 22 carried by the top wall of casing 10. On scale plate 22 is marked a scale 23 which may be calibrated in thousandths of an inch, for example. The end of pointer 21 and scale 23 are visible through a glazed opening 24 in cover plate 11. Pointer 21 is fixed at its lower end to a shaft 25 supported adjacent its two ends by fine threads 26. Shaft 25 stands parallel to and lies in the vertical plane of spring 18. Weight 12 is provided with a hole 27 through which shaft 25 extends, the hole being substantially larger in diameter than the shaft so that the shaft will never engage the wall of the hole when the device is in use. The ends of threads 26 are fastened to adjustable members fixed to casing 10. In the present instance these are shown in the form of spring arms 28 fastened to the base of casing 10 and carrying at their free ends heads 29 which stand in line with shaft 25.

In heads 29 are small holes 30 and in shaft 25 are small holes 31. Threads 26 pass through holes 31 and have their ends fixed to heads 29 by passing the ends through holes 30 and fastening them. The threads are given a half turn around shaft 25, the thread in each instance passing beneath the shaft. The purpose of this arrangement is to provide what may be termed a rolling connection between the shaft and threads and a good frictional connection. Fixed on the bottom wall of casing 10 are blocks 32 having tapped holes 33 and projecting through openings in spring arms 28 are pins 34 having heads 35 which engage arms 28 and threaded ends 36 which screw into holes 33. By turning pins 34 the shaft can be centered and the tension of threads 26 can be adjusted to the desired value.

Shaft 25 is fastened to weight 12 by two threads 38 which pass through holes 39 in the shaft. They are crossed over the top of the shaft and then pass beneath clips 40 fastened to weight 12 by screws 41. By tightening screws 41 the ends of the threads are firmly held between the clips and the surfaces of the weight. In the present instance the two threads 38 are shown as being provided from a continuous piece of thread which passes from one side of the weight to the other through holes 42 in the weight. This is only a matter of convenience, however, the two threads being quite independent. The tensions of threads 38 may be fixed by loosening screws 41, adjusting the threads to the desired tension and then tightening the screws. Threads 38 are crossed over the top of shaft 25 in order to obtain a good frictional engagement between the threads and the shaft. At 43 is a thumb screw which can be screwed into clamp weight 12 against a block 44 on the side of the casing opposite screw 43 to hold the weight when the instrument is not in use.

In using the instrument, it is set on the object subject to vibration, the screw 43 being screwed out to release the weight. If the object is vibrating in a direction at a right angle to the plane of spring 18 such vibrations will effect a movement of casing 10 of like amplitude and frequency. Owing to spring connection 18, however, the weight will remain stationary. Vibrations of casing 10 will be transmitted through threads 26 to shaft 25 which will be caused to oscillate, the shaft being held from transverse movement by threads 38 which connect it to stationary weight 12. The frequency and angular degree of oscillation of shaft 25 will be proportional to that of the object on which the instrument is placed and will be indicated by pointer 21. The instrument will respond to vibrations of the object upon which it is placed only in a direction at a right angle to spring suspension 18, vibrations in other directions not affecting it. This means that the instrument indicates the direction of the vibrations in addition to their amplitude and frequency. By setting the instrument at different angles vibrations in different directions may be investigated.

The vibration indicator, while simple in structure, is very sensitive and capable of detecting vibrations of high frequency and small amplitude. One use to which my invention is well adapted is in investigating the presence and nature of vibrations in machinery such as elastic fluid turbines, for example. The instrument may be placed at different points on the machine and at different angles and by its use the amplitude, frequency and direction of vibrations may be found.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A vibration indicator comprising a base, a wall parallel to the base and supported in spaced relation thereto, a weight, a flat spring pivot connecting the weight to the wall which provides a fulcrum permitting the base and weight to move laterally only relatively to each other, and means thread supported and actuated for indicating relative movements of the base and and weight.

2. A vibration indicator comprising a base, a wall parallel to the base and supported in spaced relation thereto, a weight, a flat spring through which the weight is suspended from the wall and by which it is limited to lateral movement only, threads connecting the weight and base, a shaft supported and controlled by said threads, whereby it will be rotated by relative movements of the weight and base, and means connected with the shaft for indicating relative movements of the base and weight.

3. A vibration indicator comprising a base, a wall parallel to the base and supported in spaced relation thereto, a weight, a flat spring through which the weight is suspended from the wall, a graduated dial, means for supporting it, a swinging pointer which moves over the dial, a shaft carrying said pointer, and threads supporting the shaft and connecting it with the base and weight whereby it will be rotated by relative movements of the base and the weight.

4. A vibration indicator comprising a base, a wall parallel to the base and supported in spaced relation thereto, a weight, a flat spring through which the weight is suspended from the wall, a shaft, an indicating means carried by the shaft, and threads which support the shaft and connect it to the base and weight.

5. A vibration indicator comprising a base, a wall parallel to the base and supported in spaced relation thereto, a weight, a flat spring through which the weight is suspended from the wall, a shaft, an indicating means carried by the shaft, threads which support the shaft and connect it to the base and weight, and means whereby the tension of the threads may be adjusted.

6. A vibration indicator comprising an enclosing case, a weight pivoted on a moment arm from the case, a flat spring forming the pivot between the moment arm and the case, said spring having an active free length between its ends of such brevity that it forms substantially a fixed pivot for said moment arm permitting lateral movement only of a vibratory nature between the case and the weight, and means interposed between the case and the weight for indicating the amplitude and frequency of their relative movement.

7. A vibration indicator comprising a base, a containing case mounted thereon, a weight, a moment arm with said weight carried on one end of it, a flat spring pivot at the other end, means provided in the case for securing said flat spring pivot whereby a short length of said flat spring will be free to bend and whereby the instrument will be sensitive to high frequency vibrations in a lateral direction only, an indicating dial fixed to the case, a swinging pointer to move over the dial, a shaft for said pointer, operating threads for the shaft, one wrapped around each end and connected to the weight, and supporting threads for the shaft, one wrapped around each end and connected with the base whereby are provided amplitude and frequency indicating means.

8. A vibration indicator comprising a base, a moving element carried by said base, a casing supported by the base, a shaft, means mounted on said shaft for indicating the relative movement of the base and moving element, a pair of flexible supporting threads for the shaft secured to and wrapped partly about it, one near each of its ends, individual tension adjusting means to which the ends of said threads are secured located in connection with the base at points diametrically opposite each other with respect to the shaft axis, a pair of flexible actuating threads for the shaft secured to and wrapped partly about it, one near each of said supporting threads, and individual tension adjusting means to which the ends of said actuating threads are secured located in connection with the moving element at points diametrically opposite each other with respect to the axis of the shaft, a spring pivot means for the moving element connected with the casing, and a moment arm connecting the weight with the spring pivot means, said spring pivot means being flat and short whereby the instrument is rendered sensitive to high speed vibrations in one plane only.

9. In a vibration indicator, the combination of a base, a wall supported on said base in spaced relation thereto, an element movable relatively to the base, and a pivot means for said element for suspending it from said wall, said pivot means comprising a thin flat spring and clamping means forming a connection with said spring at each end, said clamping means being spaced apart longitudinally of the spring to expose only a short length of the spring as compared to its width, whereby the element is rendered responsive only to high speed vibrations in one plane.

10. In an indicating instrument, the combination with a base and an element which moves relatively to the base, of means for indicating such relative movements, said means comprising a shaft, a pointer carried by the shaft, thread members which support and actuate the shaft, means for connecting said thread members to the base and to the element, and means providing a flat spring pivot for said element, said spring pivot having a short active free length less than its width whereby the element is rendered responsive only to high speed vibrations in one plane.

11. In an indicating instrument, the combination with a base and an element which moves relatively to the base, of means for indicating such relative movement, said means comprising a graduated dial, means for supporting the dial, a swinging pointer which moves over the dial relatively and along in close relation to the graduations thereon, a shaft carrying said pointer, thread members which support and actuate the shaft, means for connecting said thread members to the base and to the element, and a flat spring pivot on which said element moves, said spring pivot having a short active free length forming substantially a fixed pivot of lineal dimensions.

In witness whereof, I have hereunto set my hand this 17th day of December, 1921.

WILFRED CAMPBELL.